United States Patent [19]

Iitsuka

[11] Patent Number: 5,444,847
[45] Date of Patent: Aug. 22, 1995

[54] DATA TRANSFER METHOD FOR TRANSFERRING A DATA FRAME AMONG A PLURALITY OF DEVICES CONNECTED TO A SERIAL DATA BUS

[75] Inventor: Hiroyuki Iitsuka, Katano, Japan

[73] Assignee: Matsushita Electric Industrial Co., Ltd., Osaka, Japan

[21] Appl. No.: 871,809

[22] Filed: Apr. 21, 1992

[30] Foreign Application Priority Data

May 8, 1991 [JP] Japan .................................. 3-102444

[51] Int. Cl.⁶ .............................................. G06F 13/00
[52] U.S. Cl. .................................. 395/287; 370/85.4;
340/825.54; 364/238; 364/222.2; 364/241.8;
364/DIG. 1; 395/290; 395/291
[58] Field of Search ............... 395/200, 275; 370/85.1,
370/85.4, 85.2, 85.5, 85.12; 340/825.5, 825.52,
825.54

[56] References Cited

U.S. PATENT DOCUMENTS 4,491,946  1/1985  Kryskow, Jr. et al. ............... 370/89
4,652,874  3/1987  Loyer ........................... 340/825.05
4,949,337  8/1990  Aggers et al. ...................... 370/85.4
5,019,966  5/1991  Saito et al.

OTHER PUBLICATIONS

Moelands, "I²C bus in consumer applications," Electronic Components and Applications, vol. 5, No. 4, Sep. 1983 pp. 214–221.
Computer Design, pp. 40–41, Jan. 1986.

*Primary Examiner*—Robert L. Richardson
*Attorney, Agent, or Firm*—Stevens, Davis, Miller & Mosher

[57] ABSTRACT

A data transfer method for transferring a data frame between a plurality of devices including a controller connected to a serial data bus comprising three lines, that is, a clock line, a data line and a control line. When the control line is at a high level, the controller sequentially distributes tokens, and the control line is kept at a low level by a master while the device which has received the token becomes the master and transfers the data frame. When the control line is at the low level, the controller supplies to the clock line a clock required to transfer the data frame.

6 Claims, 8 Drawing Sheets

DATA TRANSFER METHOD FOR TRANSFERRING A DATA FRAME AMONG A PLURALITY OF DEVICES CONNECTED TO A SERIAL DATA BUS

BACKGROUND OF THE INVENTION

1. Field of the Invention

A data transfer method is classified as either a parallel transfer which uses a parallel data bus or a serial transfer which uses a serial data bus. The parallel transfer is suitable to a high speed data transfer, but it leads to the increase of the number of pins of a device such as a microprocessor or an IC.

The serial transfer is sufficient for a one-chip microprocessor used in audio/video equipment or home equipment from a standpoint of a transfer speed. Accordingly, such equipment uses the serial transfer which can reduce the number of pins of the microprocessor. Recently, as performance of such equipment has been improved, a plurality of microprocessors have been built into one product such as a video tape recorder or a camera with built-in video equipment. Those microprocessors do not operate independently but operate while transferring data to each other through the serial data bus. Not only, the microprocessors, but also various IC's and LSI's, may be connected to the serial data bus.

The present invention relates to a data transfer method in which data frames are serially transferred between a plurality of devices (particularly microprocessors).

2. Description of the Prior Art

One of the prior art data transfer methods by serial transfer is an I²C (Inter-Integrated Circuit) method disclosed in ELECTRIC COMPONENTS AND APPLICATIONS Vol. 5, No. 4, September 1983, pages 214–211.

The I²C as an example of the prior art data transfer method is explained below.

Figure 9:
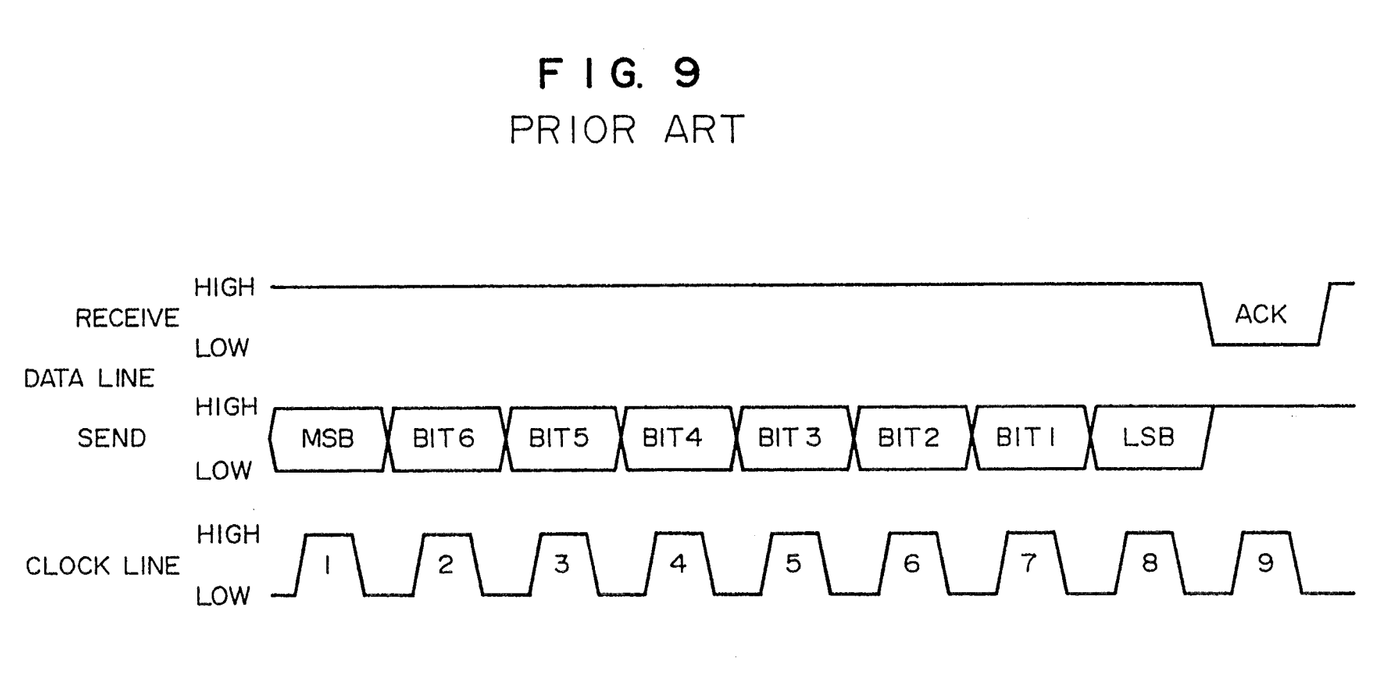
FIG. 9 shows a timing chart of a data transfer operation by a prior art I²C.

FIG. 9 shows a timing chart of the data transfer by the I²C. The I²C uses two signal lines, a data line, and a clock line to transfer data at a timing shown in FIG. 9. The transfer is made nine bits at a time, namely, 8-bit data and a one-bit acknowledge bit (hereinafter referred to as an ACK bit). A sending station first outputs the 8-bit data on a data line with an MSB at a first portion, in synchronism with a clock; a receiving station outputs an ACK bit at the next clock.

The sending station outputs a high level on the data line while the receiving station outputs the ACK bit, but since the receiving station outputs a low level on the data line, the data line is maintained at the low level as a whole. At the ninth bit, the sending station knows that the data line is at the low level in spite of the fact that it outputs the high level and recognizes the reception of the data by the receiving station.

Figure 10:
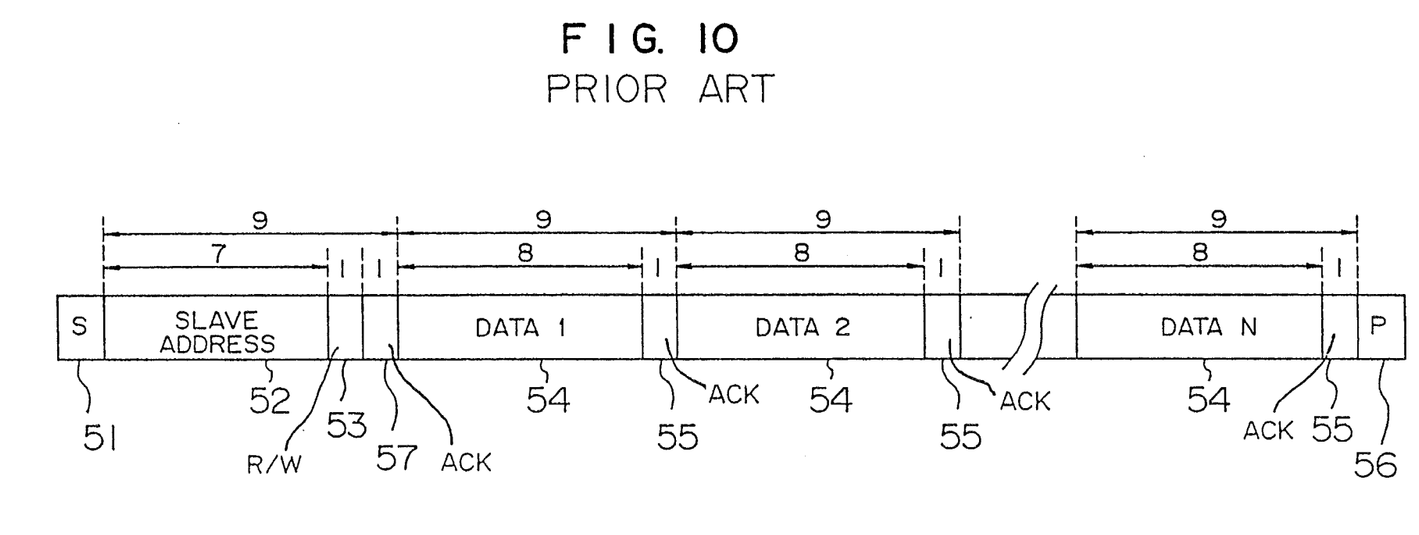
FIG. 10 shows a format of a data frame in the data transfer by the prior art I²C.

FIG. 10 shows a format of a data frame in the data transfer by the I²C. In FIG. 10, a start condition 51 and a stop condition 56 are a start condition and a stop condition for the transfer of the data frame, respectively. As shown in FIG. 9, in the I²C, the data line may transit only when the clock line is at the low level. Exceptions of the rule are the start condition 51 and the stop condition 56. Under the start condition 51, the data line transits from the high level to the low level when the clock line is at the high level. Under the stop condition 56, the data line transits from the low level to the high level when the clock line is at the high level. The start condition 51 is initiated prior to the transfer of the data frame, and the stop condition 56 indicates the end of the transfer of the data frame.

A leading byte of the data frame comprises a 7-bit slave address 52 and a 1-bit R/W bit 53. The slave address 52 is a 7-bit address which is used to designate one of the devices connected to the I²C as a slave. A device which starts the transfer of the data frame is called a master. The master generates the start condition 51 to output the slave address in order to designate the slave to which the data is to be transferred. The R/W bit 53 designates whether the master or the slave is to output data 54 in a second and subsequent bytes of the data frame. When the R/W bit 53 is at the high level, the slave outputs the subsequent data, and the master, which is the receiving station, outputs the ACK bit 55. When the R/W bit 53 is at the low level, the master output the subsequent data 54, and the slave, which is the receiving station, outputs the ACK bit 55. Since the master always outputs the leading byte of the data frame, the slave always output the ACK bit 57.

In the I²C, the one-to-one transfer is made between the master and the slave as described above. After the master has generated the start condition 51, it designates the slave by the slave address 52 of the first output byte. The slave address 52 includes an address called a general call address. It has a value of 00 h (hexadecimal notation) and can designate all devices as slaves. When this address is used, all devices must theoretically respond, but it is permitted to ignore the address. Namely, when the general call address is used, the data frame can be sent to all devices which acknowledge the address.

The sending of the same data frame to a plurality of destinations is generally called a broadcasting communication.

In the prior art system, however, since the general call address is prepared only for the broadcasting communication, the broadcasting communication to designated plurality of devices is not attained. Assuming, for example, that five devices A, B, C, D and E are connected to a bus and the devices B, C and D acknowledge the general call address. In this case, the device A may make the broadcasting communication to the devices B, C and D, but it cannot make the broadcasting communication to the devices B and D, or the devices C, D and E.

Further, in the prior art system, since the ACK bit comprises one bit, the sending station cannot check whether all devices have received the data frame in the broadcasting communication. In the above example, when the device A makes the broadcasting communication to the devices B, C and D, the data line is at the low level if one of the devices B, C and D outputs the ACK bit. Accordingly, it is not clear whether all of the devices B, C and D have acknowledged.

In the prior art system, the ACK bit is unconditionally output when one-byte data is received. Accordingly, even if an error occurs in the course of data transmission and erroneous data is sent to the slave, neither the master nor the slave can detect it.

In a prior art multi-master system in which a plurality of devices may be masters, the plurality of masters may simultaneously start the transfer, and the data frame may not be normally transferred. In order to avoid it, such a result is necessary for the I²C to monitor the data or clock which it generates. If the data line is at the low level in spite of the fact that the high level is output to the data line, the transfer must immediately be stopped. One method to avoid such a collision is a token system transfer method which is one implementation of LAN (local area network). (For example, see Computer Design, January 1986, pages 40– 41). In the token system, a device which has received a token gets a right to use the bus to transfer the data frame. In this system, it is necessary to modulate the token and the data in a predetermined procedure before they are sent out so that they are different from each other. If modulation is not made, a pattern in use for a token may not be used in the data frame.

Where the I²C is to be used in the multi-master system or where the token system is used, there is no device which manages the entire bus system, and all devices connected to the bus are equal for the right to use the bus. However, it is preferable if a priority may be set for each device as to the use of the bus because freedom of overall system design increases. However, where non-specified devices are connected like the LAN, a complex protocol is required to set the priority.

In the I²C, it is necessary that the device which uses the bus as the master always output the clock. Accordingly, all devices which can be masters must have functions to output the clock. Where a system is designed such that one device outputs the transfer clock, the device which outputs the clock must confirm that the device which is to output the data is ready to output.

SUMMARY OF THE INVENTION

It is an object of the present invention to provide a data transfer method which permits the broadcasting communication of a data frame to any designated plurality of slaves, permits the master to recognize the slaves which have received the data frame in the broadcasting communication and can detect failure of the transfer of the data frame due to a data error.

It is another object of the present invention to provide a data transfer system in a closed system which is a multi-master system and in which the devices connected to the bus are limited, which permits easy setting of a priority to use the bus and can effectively utilize the bus resource.

In order to achieve the above objects in the data transfer method of the present invention, a plurality of devices including one controller are interconnected through a serial data bus comprising three signal lines, namely, a data line, a clock line and a control line. When the control line is at the high level, the controller sequentially sends tokens to the devices at predetermined time intervals. A device which is to transfer a data frame transits the control line to the low level in a time period between the reception of the token addressed to its own device and the output of the next token by the controller in order to become a master. The master transfers the data frame to two or more slaves, and when the transfer of the data frame is over, it returns the control line to the high level. When the control line is at the low level, the controller outputs a clock required for the transfer of the data frame, and when the control line returns to the high level, the controller resumes the send-out of the token.

In this manner, the collision in the transfer of the data frame is prevented, modulation is not required in the transfer and a data frame of any pattern can be transferred. Through the use of the control line, each device can distinguish the token from data in the data frame even if the same pattern as the token occurs in the data frame. By the use of the control line, the devices connected to the bus need not always monitor the data line and the clock line, but they normally need monitor only the control line. Where the devices connected to the bus are microprocessors, a process time relating to the transfer of the data frame is significantly reduced. The controller may determine whether to output the token or not by monitoring the control line. In the prior art token system, the device which has received the token outputs the next token. In the present invention, only the controller outputs the token. Accordingly, an error recovery process for an error such as a loss of the token in the distribution of the token is easy to conduct. Since the controller outputs the clock required for the transfer of the data and the token, a burden on the master device can be reduced. Namely, when a device other than the controller outputs the data frame, the device which is to output the data frame need not manage the timing of the clock generation. In other words, the device other than the controller requires no clock generation function.

In the data transfer method of the present invention, each bit of the address data contained in the head of the data frame is an address bit for one device, and the master device makes the address bits of one or more slaves true and outputs the data frame. The devices other than the master serve as the slaves when their own address bits in the address data are true and receive the data frames output by the master.

In this manner, the master can make the broadcasting communication to any plurality of devices.

In the data transfer method of the present invention, the data frame is transferred by a send step in which the master sends the data frame to one or more slaves, and an acknowledge step in which one or more slaves which have received the data frame send the acknowledge data to the master. Each device is allocated with at least one-bit specific acknowledge bit, and when the slave receives the data frame in the send step, it outputs the acknowledge data in the acknowledge step such that only the acknowledge data of its own is at the low level on the data bus. The master receives wired-OR data of the acknowledge data on the data line.

Thus, when the broadcasting communication is made, the master checks the acknowledge bits of the acknowledge data which it receives in the acknowledge step to determine which devices have received the data frame. Thus, in the broadcasting communication, the devices which have received the data frame can be identified.

In the data transfer method of the present invention, the master sends the data frame which contains an error detection code to the slave, and the slave detects any data error in the received data frame by using the error detection code and sends the acknowledge data in the acknowledge step only when there is no error.

Thus, the master can identify the devices which have received the data frame without error. In other words, the master can determine whether the retransmission of the data frame is required or not.

In the data transfer method of the present invention, the controller sends more tokens to a device which more frequently uses the serial data bus than to a device which less frequently uses the serial data bus.

As a result, a priority may be set to the devices which use the serial data bus, and the efficiency to use the bus is improved. In a closed system in which a plurality of microprocessors in one piece of equipment transfer data through the bus, the types of data transfer to be performed are limited. Accordingly, the entire bus system may be readily managed by weighting the distribution of the token.

In the data transfer method of the present invention, when the master sends the data frame, it transits the data line to the low level when the output of one transfer unit of data is ready. After the data line has been transited to the low level, the controller outputs the clock to the clock line, and the master transits the data line to the high level when one transfer unit of data has been output.

Thus, even if the preparation of the master for outputting the data is delayed, the controller delays output of the clock to prevent the transfer error.

DESCRIPTION OF THE PREFERRED EMBODIMENTS

One embodiment of the present invention is now explained in detail with reference to the drawings.

Figure 1:
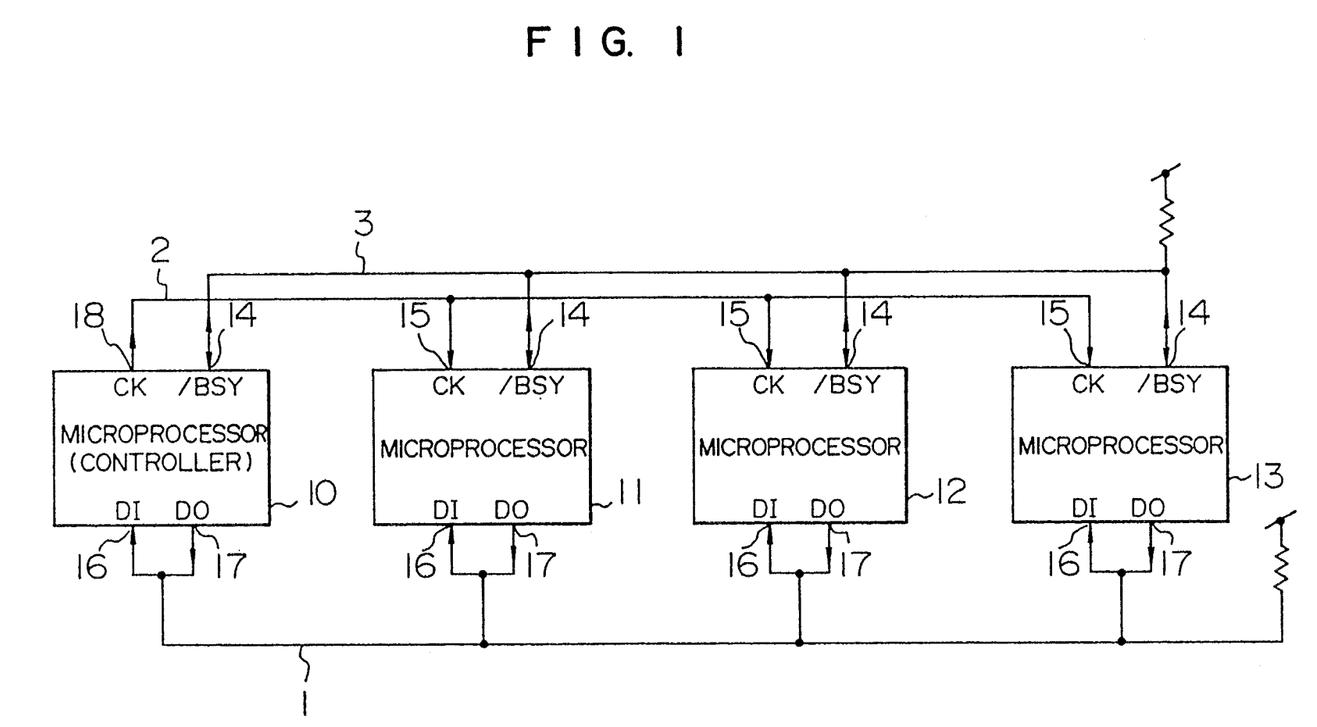
FIG. 1 shows a block diagram of a configuration of a system for transferring data by using a data transfer method in accordance with an embodiment of the present invention.

FIG. 1 shows a block diagram of a system for transferring data by the data transfer method in accordance with one embodiment of the present invention. In FIG. 1, microprocessors 10, 11, 12 and 13 are one-chip microprocessors which are interconnected through a bus comprising three signal lines: a data line 1, a clock line 2 and a /BSY line 3. The data line 1 is a signal line for transferring serial data, and it is connected to both a data input port 16 and a data output port 17 of each microprocessor. The microprocessor 10 outputs a clock for inputting and outputting the serial data from a clock output port 18 on the clock line 2. Other microprocessors receive this signal at clock input ports 15. The /BSY line 3 is a signal line for a /BSY signal which is a negative logic signal and kept at the low level by the microprocessor which transfers the data frame. When the /BSY signal is at the high level, none of the microprocessors outputs the data frame.

An operation when the data transfer method of the present invention is implemented in the above system is now explained.

The timing between the serial data and the clock is first explained with reference to FIG. 2. As shown at (a) in the upper part of FIG. 2, the serial data transferred over the data line 1 is outputt at the fall of the clock. The serial data is read at the rise of the clock. A period of the clock is Ta. The data is intermittently transferred 8 bits at a time. Eight clocks required for the transfer of the 8-bit data are called a byte clock. As shown at (b) in the lower part of FIG. 2, the byte clock is intermittently output at a period Tb.

Many one-chip microprocessors attain the function of serially transferring data 8 bits at a time by hardware. Such hardware is herein called a shift buffer. The shift buffer comprises a shift register and a peripheral circuit, and it inputs and outputs data by a clock supplied externally to the microprocessor (external clock) or a clock generated in the microprocessor (internal clock). When serial data is to be output, it is sequentially output starting from an MSB at the fall of the clock, and when the serial data is to be input, it is serially read starting from the MSB at the rise of the clock.

An output port of the serial data to be output from the shift buffer is a data output port 17, and an input port of the serial data to be input to the shift buffer is a data input port 16. Input and output of a clock port of the shift buffer are not independent, but instead, only a clock input/output port is provided. This port functions as an output port when the shift buffer transfers the data by the internal clock, and functions as an input port when it transfers the data by the external clock. The microprocessor 10 operates by the internal clock, as it needs to output the clock, and other microprocessors operate by the external clock. Accordingly, the clock input/output port functions as a clock output port 18 in the microprocessor 10 and functions as a clock input port 15 in other microprocessors.

Terms used in the present embodiment are explained below.

"Master": A microprocessor which acquires a right to use a bus to output a data frame is called a master. Each of the microprocessors 10, 11, 12 and 13 can be a master, but a plurality of microprocessors cannot simultaneously be masters. The master asserts a /BSY signal (sets it to the low level) before it outputs a data frame. After it has output the data frame and received acknowledge data, it negates the /BSY signal (sets it to the high level).

"Slave": A microprocessor designated by the master is called a slave. The data frame is transferred from the master to the slave. When the master transfers the data frame to a plurality of microprocessors (broadcasting communication), there are a plurality of slaves. When the /BSY signal is at the high level, there is no master or slave in the system.

"Controller": That one of the microprocessors connected to the bus which outputs the clock is called a controller. Only one controller exists in the system. In the system shown in FIG. 1, the microprocessor 10 is the controller. The controller also outputs a token, to be described later.

"Token": It is one-byte data which the controller outputs to arbitrate the right to use the bus. The microprocessor which has received the token acquires a right to use the bus to output the data frame, that is, a right to be the master.

"Data frame": A minimum unit for the data transfer is called a data frame. The data frame comprises a header, user data and a check byte.

The bus arbitration by using the token which is conducted prior to the transfer of the data frame is now explained with reference to FIGS. 3 and 4.

Figure 3:
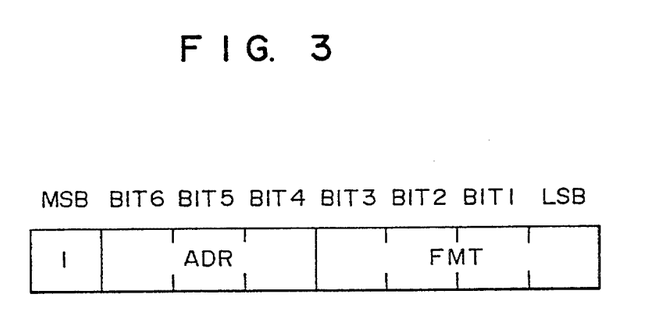
FIG. 3 shows a format of a token in the embodiment.

FIG. 3 shows a format of the token. The token comprises one byte. ADR at bits 6–4 is a token destination address which indicates an address of a token destination microprocessor. A specific address (0–7) is assigned to each of the microprocessors connected to the bus. The address allocation is shown in Table 1.

TABLE 1

| bit 6 | bit 5 | bit 4 | Address | Corresponding microprocessor |
|---|---|---|---|---|
| 0 | 0 | 0 | 0 | Microprocessor 10 |
| 0 | 0 | 1 | 1 | Microprocessor 11 |
| 0 | 1 | 0 | 2 | Microprocessor 12 |
| 0 | 1 | 1 | 3 | Microprocessor 13 |
| 1 | 0 | 0 | 4 | No counterpart |
| 1 | 0 | 1 | 5 | No counterpart |
| 1 | 1 | 0 | 6 | No counterpart |
| 1 | 1 | 1 | 7 | No counterpart |

As shown in Table 1, four addresses 0–3 of the addresses 0–7 are actually used, although up to eight microprocessors may be connected to the bus. A format number (FMT) is stored at bits 3–0. The format of the data frame to be described later is designated by the format number. In the present case, the format number is 0000 (binary notation).

Figure 4:
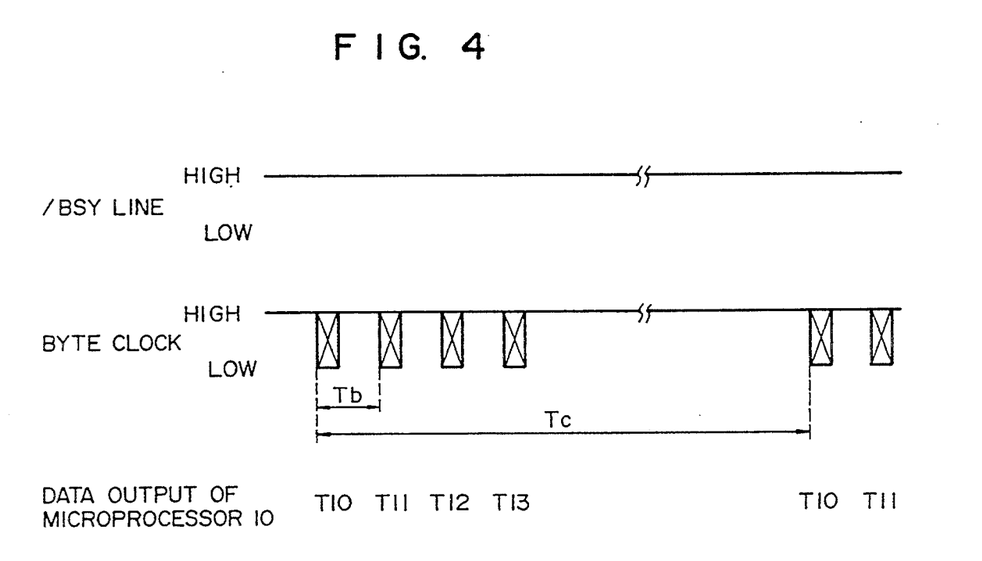
FIG. 4 shows a timing chart showing a manner of distribution of the token by a microprocessor 10 in the embodiment.

FIG. 4 shows a timing chart showing a manner of distribution of the token by the microprocessor 10. When the /BSY line 3 is at the high level, the controller microprocessor 10 outputs the tokens. T10, T11, T12 and T13 denote the tokens to be output to the microprocessors 10, 11, 12 and 13, respectively. While the /BSY line 3 is at the high level, the microprocessor 10 sequentially sends the tokens at the interval of Tb. For example, when the token is to be sent to the microprocessor 12, the microprocessor 10 outputs the token 10100000 (binary notation) on the data line 1.

If none of the microprocessors to which the microprocessor 10 has sequentially output the tokens outputs the data frame, the microprocessor 10 stops the output of the token. When none of the microprocessors including the controller becomes the master, the output of the tokens to the microprocessors is conducted at a constant interval (Tc).

An operation when the microprocessor which has received the token outputs the data frame is now explained with reference to FIG. 5.

Figure 5:
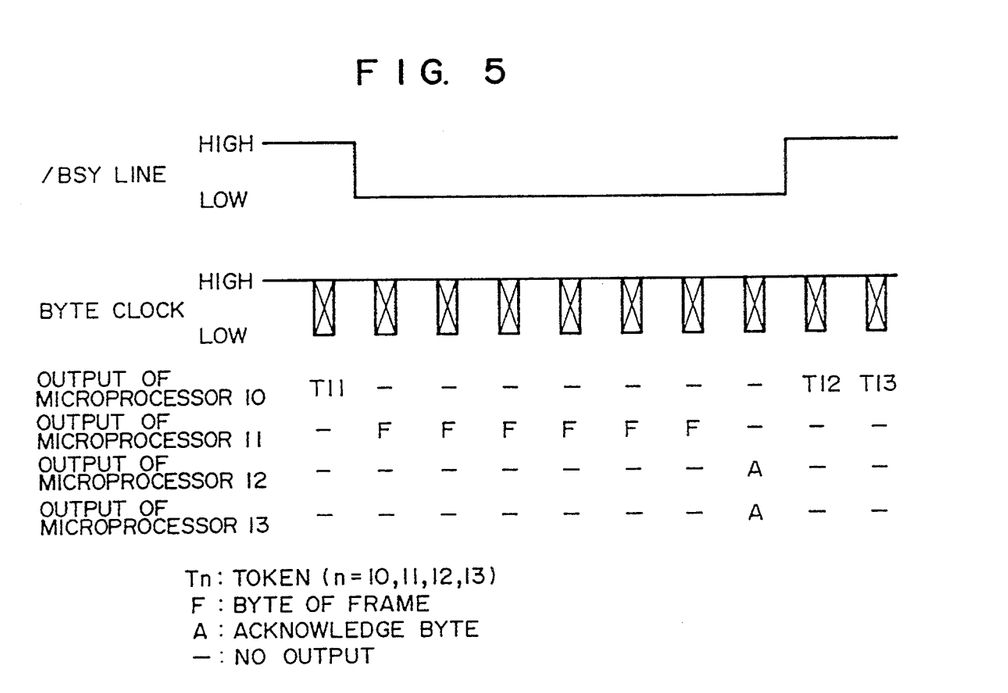
FIG. 5 shows a timing chart showing a manner of output of a data frame in the embodiment.

FIG. 5 shows a timing chart showing a manner of output of the data frame. In FIG. 5, T11, T12 and T13 denote the tokens which the microprocessor 10 outputs. F denotes a byte of the data frame which the microprocessor 11 outputs. A denotes acknowledge data which the microprocessor 12 or 13 outputs.

FIG. 5 shows a manner of transfer of the data frame by the microprocessor 11 to the microprocessors 12 and 13. The microprocessor 11 receives the token which the microprocessor 10 has output, asserts the /BSY signal and then sequentially outputs the data frame one byte at a time. Starting at the next byte clock after the output of the data frame has been completed, the microprocessors 12 and 13 output the acknowledge data at the next byte clock. The two acknowledge data are wired-ORed on the data line 1, and the result is supplied to the microprocessor 11, which, upon receipt, negates the /BSY signal.

In this manner, when the microprocessor which has received the token transfers the data frame, it asserts the /BSY signal before it transfers the data frame. The assertion of the /BSY signal must be done before the controller outputs the next token. When the microprocessor 10 which outputs the token detects the assertion of the /BSY signal, it stops the output of the token and outputs only the byte clock. After the master microprocessor has completed the output of the data frame and received the acknowledge data, it negates the /BSY signal. When the microprocessor 10 detects the negation of the /BSY signal, it resumes the output of the token.

After the /BSY signal has been negated, the controller sequentially outputs the tokens to all microprocessors, and when it confirms that none of the microprocessors transfers the data frame, it stops the output of the byte clock of the period Tb. In this case, it output the token again the time Tc after the output of the previous token.

A format of the data frame is now explained with reference to FIG. 6.

Figure 6:
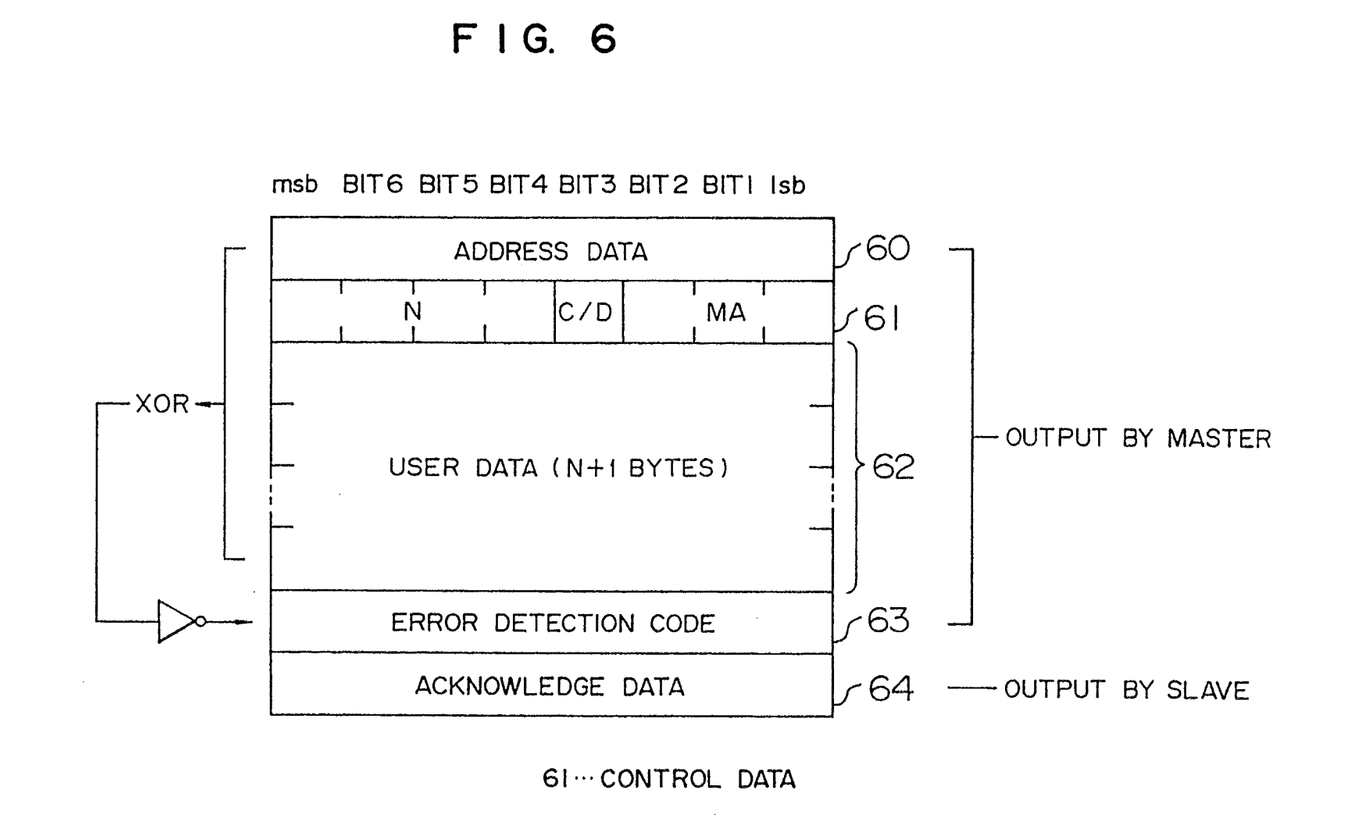
FIG. 6 shows formats of the data frame and acknowledge data in the embodiment.

FIG. 6 shows formats of the data frame and the acknowledge data. The data frame comprises address data 60, control data 61, user data 62 and a check byte 63. When the master completes the output of the data frame, the slave outputs one-byte acknowledge data 64 at the next byte clock.

The address data 60 designates the slave. The address data is bit assigned, and each bit is associated with one microprocessor. The relation between the bit pattern of the address data and the slave microprocessor is shown in Table 2.

TABLE 2

| | Address data | | | | | | | Address of slave microprocessor |
|---|---|---|---|---|---|---|---|---|
| MSB | bit 6 | bit 5 | bit 4 | bit 3 | bit 2 | bit 1 | LSB | |
| x | x | x | x | x | x | x | 1 | 0 (microprocessor 10) |
| x | x | x | x | x | x | 1 | x | 1 (Microprocessor 11) |
| x | x | x | x | x | 1 | x | x | 2 (Microprocessor 12) |
| x | x | x | x | 1 | x | x | x | 3 (Microprocessor 13) |
| x | x | x | 1 | x | x | x | x | 4 (No counterpart) |
| x | x | 1 | x | x | x | x | x | 5 (No counterpart) |
| x | 1 | x | x | x | x | x | x | 6 (No counterpart) |
| 1 | x | x | x | x | x | x | x | 7 (No counterpart) |

In Table 2, X may be either "1" or "0". The address bit of the microprocessor which has the address N (N=0–7) is the bit N of the address data 60. Accordingly, the master microprocessor can selectively designate the slave device. Namely, the master microprocessor may output the address data 60 which makes the address bit of the microprocessor to be designated as the slave true ("1") and makes the address bits of the microprocessors not to be designated as the slave false ("0"). When the microprocessor 11 sends the data frame to the microprocessors 12 and 13, the address data 60 may be 00001100 (binary notation). In this case, the bit which indicates the address of the master itself is set to "0". After the /BSY signal has been asserted, the microprocessors other than the master recognize the 8-bit data first received as the address data. If a microprocessor determines that the address bit of its own is true ("1"), it recognizes the designation as the slave and receives the data frame.

The four bits, MSB and bits 6–4 of the control data 61 indicate (the number of bytes of the user data 62)−1. Patterns 0000–1111 (binary notation) may be used so that the number of bytes of the user data 62 may be any one of 1–16. The slave microprocessor recognizes the number of bytes of the data frame from this value, and outputs the acknowledge data 64 after it has received the data frame. The bit 3 of the control data 61 indicates whether the content of the user data 61 is command or data. If the bit is "0", the control data 61 is data, and if it is "1", the control data 61 is command. The bits 2, 1 and LSB of the control data 61 are master address. The address of the master microprocessor is indicated by the same rule as that of Table 1.

The user data 62 is data or a command which is actually sent from the master to the slave.

The one-byte error detection code 63 is an error checking byte in which odd parities for the bits from the leading byte (address data 60) of the data frame to the ending byte of the user data are recorded. The master exclusively ORs them byte by byte starting from the leading byte of the data frame and inverts the result to prepare the error detection code 63. On the other hand, when the microprocessor receives the data frame, it exclusively ORs from the beginning of the data frame to the CHK byte byte by byte, and if the result is FFh (hexadecimal notation), it confirms the reception without error.

The data frame comprising the address data 60, the control data 61, the user data 62 and the error detection code 63 is output by the master, while the acknowledge data 64 is output by the slave. The acknowledge data 64 comprises one byte. Each bit of the acknowledge data 64 is assigned to an acknowledge bit of one microprocessor. The acknowledge bit of the microprocessor having the address N (N=0–7) corresponds to the bit N of the acknowledge data 64. When the slave receives the data frame, it detects any data error by the error detection code 63, and if there is no error, it outputs the acknowledge data 64 with only the acknowledge bit of its own being at the low level. The shift buffer outputs the data on the data line 1 by the negative logic. Thus, when the slave normally receives the data frame, it outputs the acknowledge data 64 with only the acknowledge bit of its own being "1". The acknowledge data 64 of the respective microprocessors are shown in Table 3.

TABLE 3

| | Acknowledge data | | | | | | | Microprocessor address |
|---|---|---|---|---|---|---|---|---|
| MSB | bit 6 | bit 5 | bit 4 | bit 3 | bit 2 | bit 1 | LSB | |
| 0 | 0 | 0 | 0 | 0 | 0 | 0 | 1 | 0 (Microprocessor 10) |
| 0 | 0 | 0 | 0 | 0 | 0 | 1 | 0 | 1 (Microprocessor 11) |
| 0 | 0 | 0 | 0 | 0 | 1 | 0 | 0 | 2 (Microprocessor 12) |
| 0 | 0 | 0 | 0 | 1 | 0 | 0 | 0 | 3 (Microprocessor 13) |
| 0 | 0 | 0 | 1 | 0 | 0 | 0 | 0 | 4 (No counterpart) |
| 0 | 0 | 1 | 0 | 0 | 0 | 0 | 0 | 5 (No counterpart) |
| 0 | 1 | 0 | 0 | 0 | 0 | 0 | 0 | 6 (No counterpart) |
| 1 | 0 | 0 | 0 | 0 | 0 | 0 | 0 | 7 (No counterpart) |

Since the data line 1 is wired-ORed, a logical OR function is sent to the master when a plurality of slaves output the acknowledge data.

An operation when a plurality of slaves output the acknowledge data 64 is now explained with reference to FIG. 7.

Figure 7:
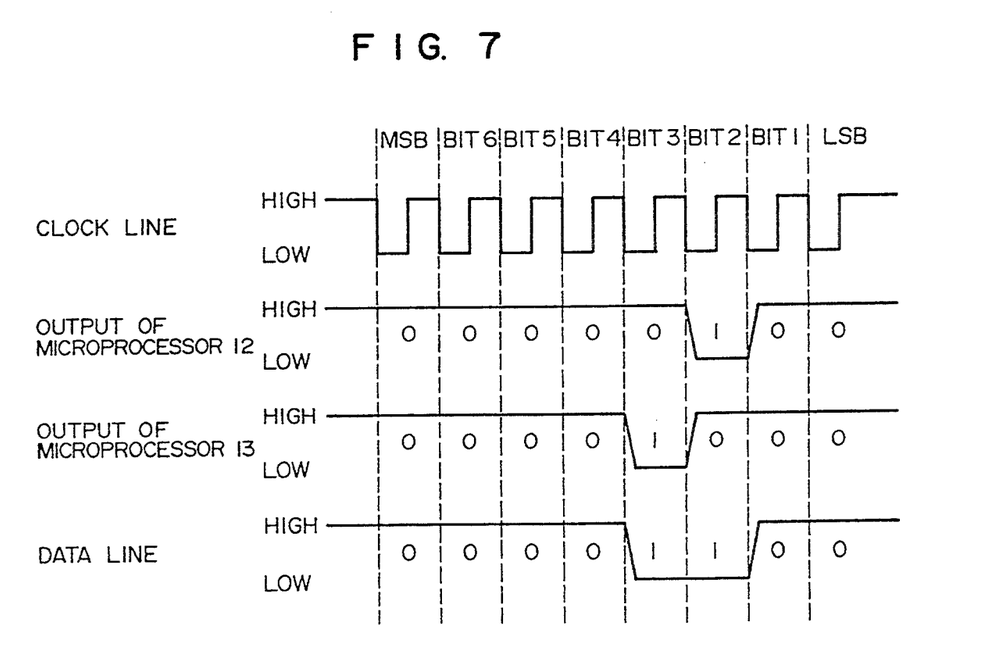
FIG. 7 shows a timing of an operation when a plurality of microprocessors output acknowledge data.

FIG. 7 shows a timing chart when the plurality of microprocessors output the acknowledge data. In FIG. 7, the microprocessors 12 and 13 output the acknowledge data of their own to the data line 1 in synchronism with the clock. Since the address of the microprocessor 12 is "2", it outputs the acknowledge data (00000100) with only the bit 2 being at the low level, and the microprocessor 13 outputs the acknowledge data (00001000) at the same clock. Since the outputs of the bits 2 and 3 are different, but the low level has the priority, the acknowledge data 00001100 is finally outputted to the data line 1. The acknowledge data is supplied to the master which can determine which microprocessor has received the data frame, based on the bit pattern.

For example, it is assumed that the master outputs the data frame having the address data 60 00001100 (binary notation) and receives the acknowledge data 64 "00001000" at the first byte clock after the output of the data frame. In this case, the master determines that the microprocessor having the address "3" has received the data frame but the microprocessor having the address "2" has not received it. In other words, if the bit patterns of the sent address data 60 and the received acknowledge data 64 are identical, the master determines that the data frame has been normally transferred.

Even if it is determined by the check of the acknowledge data that the designated slave has not received the data frame, the master must negate the /BSY signal to give up the right to use the bus.

An initialization process which is conducted when the system is started up at the power-on or the system reset is now explained.

When the system is started up, the controller asserts the /BSY signal and issues an initialization check frame shown in Table 4 to check whether the microprocessors on the bus are in the operating condition or not.

TABLE 4

| Initialization check frame | | | | | | | | |
|---|---|---|---|---|---|---|---|---|
| MSB | bit 6 | bit 5 | bit 4 | bit 3 | bit 2 | bit 1 | LSB | Content |
| 1 | 1 | 1 | 1 | 1 | 1 | 1 | 0 | Address data |
| 0 | 0 | 0 | 0 | 1 | 0 | 0 | 0 | Control data |
| 0 | 0 | 0 | 0 | 0 | 0 | 0 | 0 | User data |
| 0 | 0 | 0 | 0 | 1 | 0 | 0 | 1 | Check byte |

The address data 60 indicates that the controller is broadcasting a communication to all microprocessors other than itself. The control data 61 indicates that the user data 62 comprises one byte, the type is command, and the master address is "0" (controller). The one byte of the user data 62 sends "00h" which indicates nop. The error detection code 63 includes odd parities from the address data 60 to the user data 62. The controller outputs the token for itself and then asserts the /BSY signal and outputs the byte clock to send out the initialization check data frame. The microprocessor which has already completed the initialization outputs the acknowledge data 64. When it detects the acknowledge data 64, it can determine whether the initialization of the microprocessors in the equipment has been completed or not. A microprocessor temporarily connected to the bus may also be detected. This is a microprocessor which is temporarily connected for adjustment or repair of the equipment, and it is assigned an address other than those of the microprocessors 10, 11, 12 and 13. In this manner, the microprocessor may be temporarily connected to the bus. Accordingly, the address data 60 of the initialization check data frame is set to send the data frame to a microprocessor other than those microprocessors which are inherently in the equipment.

When the microprocessor which has not yet been initialized is detected, the controller negates the /BSY signal, and after a predetermined period, outputs the token again to itself and asserts the /BSY signal to send out the initialization check data frame. After the initialization check data frame has been normally sent, the controller starts to output the token.

Figure 2:
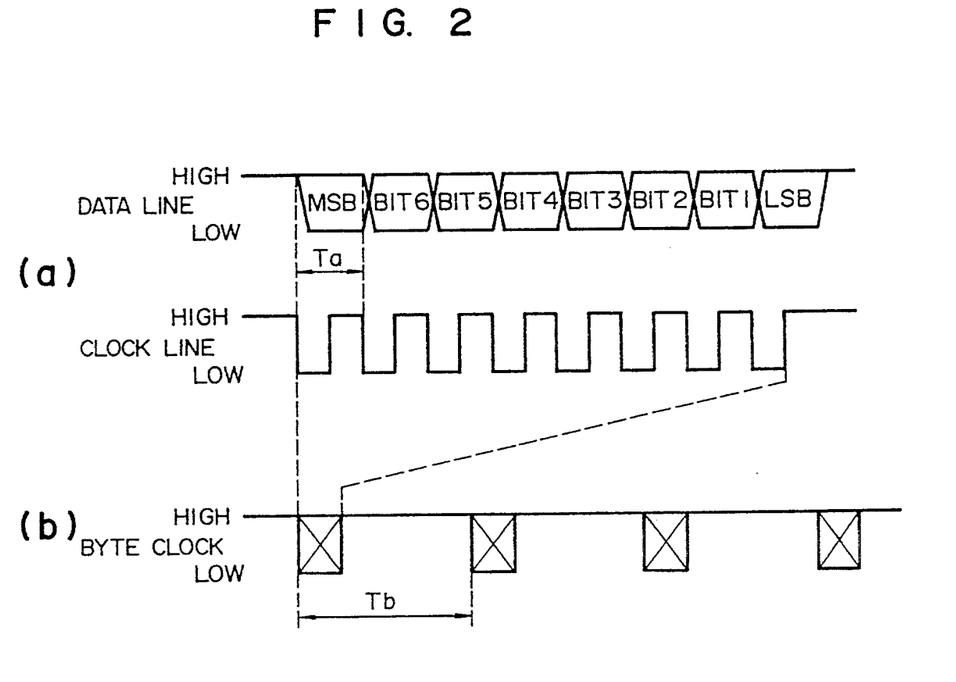
FIG. 2 shows a timing chart showing a relation between a data line 1 and a clock line 2 in the embodiment.

A method for determining the bit clock period (Ta), the byte clock period (Tb) and the token transfer repetition period (Tc) shown in FIGS. 2 and 4 is now explained.

The microprocessor in the system which has a shortest interval of occurrence of a data frame transfer request is searched and the minimum interval of the data frame transfer request is defined as Tc. Then, the number of byte clocks required in the period Tc is determined based on the number of data frames which have to be transferred in the period Tc, the number of bytes of the data frame and the number of microprocessors connected to the bus, and Tb is determined. In this case, the microprocessor which may be temporarily connected to the bus should also be taken into consideration. Ta is determined based on the capabilities of the microprocessors and a noise generated in the equipment. For example, where the shift buffer built in the microprocessor is not a double buffer, the shift buffer cannot be read or written during the output of the byte clock. Thus, it is necessary to read or write the shift buffer while the byte clock is not output. If the period is short, the interruption process of the microprocessor must be done at a high speed. In order to give a margin to the process, Ta may be shortened. However, as Ta is shortened, the effect of noise generated in the equipment cannot be ignored.

A method of connection of the /BSY line 3 to the microprocessor is now explained.

As described above, the microprocessor can determine whether the data or the token is being transferred by checking the /BSY line 3. Accordingly, the microprocessor may monitor the /BSY line 3 in the interruption routine of the serial transfer. However, the microprocessor which has not assured the transfer request for the data frame need only receive the data and need not monitor the bus when the /BSY line 3 is at the high level. Even if the /BSY line 3 transits to the low level, the microprocessor may ignore the bus until the /BSY line 3 next transits from the high level to the low level if it is not designated as the slave. In order to attain this, the /BSY line 3 is connected to the external interruption input port of the microprocessor. Thus, the microprocessor which has not issued the transfer request for the data frame is interrupted at the falling edge of the /BSY line 3 and inhibits the interruption for the serial reception until the external interruption is requested. When it receives the address data 60 by the serial reception interruption and if the address data 60 does not indicate a transfer to that microprocessor, it again inhibits the serial reception interruption. In this manner, when the external interruption is used to monitor the /BSY line 3, the number of times of serial reception interruption can be minimized. Since presently available microprocessors are not equipped with the output port function in the external interruption input port, the microprocessor which may be the master has to secure a general purpose output port for the output of the /BSY signal. The microprocessor which does not use the external interruption and inputs and outputs the /BSY signal by using the general purpose input/output port always has to enable the serial reception interruption to monitor the /BSY line 3 in the serial interruption routine or monitor the /BSY line 3 periodically by using a timer interruption.

An operation of the master and the controller when the /BSY line 3 is at the low level and the microprocessor other than the controller outputs the data frame is now explained.

In this case, the controller outputs the byte clock, and the master has to output the data in synchronism with the clock. Accordingly, the master must be ready for the next output by the output of the byte clock from the master after the master has output the data. If the byte clock is output from the controller when the master is not ready for the output, a transfer error may take place. A method for preventing it is explained with reference to FIG. 8.

Figure 8:
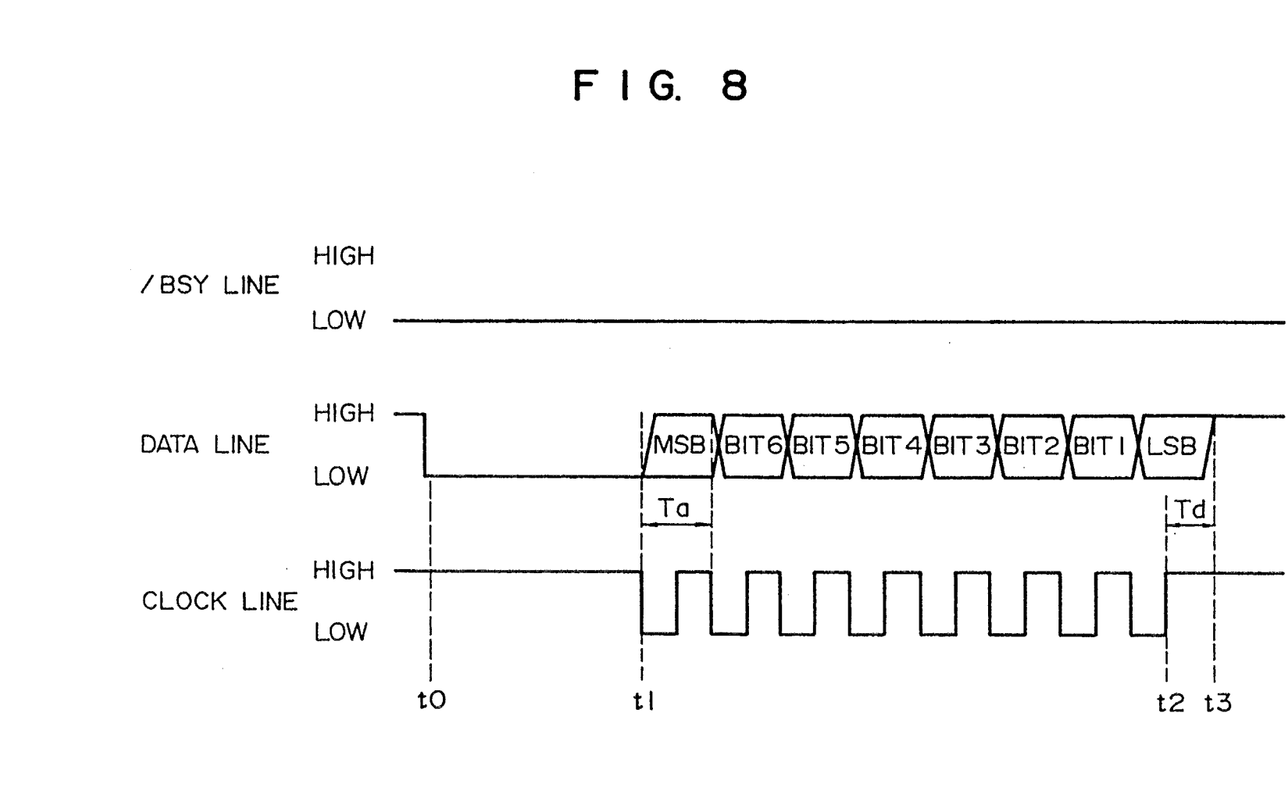
FIG. 8 shows a timing chart of an operation when a microprocessor other than the controller outputs data.

FIG. 8 shows a timing chart when the microprocessor other than the controller outputs the data. In this case, the /BSY line 3 is kept at the low level by the master which outputs the data. The master transits the data line 1 to the low level (time t0) where it is ready for the output of the data. The controller checks the data line 1 when the period Tb has elapsed since the previous output of the byte clock, and if the data line 1 is at the low level, it starts to output the byte clock (time t1). If the data line 1 is at the high level, the controller does not output the byte clock, but it outputs the byte clock after the data line 1 has been driven to the low level by the master. It is necessary to transit the data line to the high level at time t3 when a predetermined period (Td) has elapsed since the rise of the last clock of the byte clock at a time t2. The period Td must at least meet a hold time of the data from the rise of the clock in the receiving station of the data.

In the present embodiment, the master outputs the address data with the address bit for the microprocessor designated as the slave being "1", together with the data frame, and the other microprocessors connected to the bus receive the data frame when the address bits of their own are "1". Thus, the master may conduct the broadcasting communication of the data frame to any plurality of slaves.

The slave which has received the data frame outputs the acknowledge data with only the acknowledge bit assigned thereto being at the low level, and the acknowledge data output from the plurality of slaves are wired-ORed on the data line, and the result is supplied to the device which has output the data frame. Thus, the slave which has received the data frame may be determined by examining the acknowledge bit of the input acknowledge data.

Further, since only the slave which has received the data frame without error outputs the acknowledge data, the master may identify the slave which has received the data frame without error.

The control line is provided in addition to the data line and the clock line, and the control line is kept at the low level while the device which receives the token and uses the bus is using the bus, and the controller outputs the token only when the control line is at the high level. Accordingly, the collision of transfer is avoided, no modulation is needed for the transfer and the data frame in any pattern may be transferred.

Further, since the controller outputs the clock required to transfer the data and the token, the burden of the master device in the multi-master system in reduced.

The device which outputs the data transits the data line to the low level when it is ready to output the data, and the controller outputs the clock on the clock line after the data line has transited to the low level. Accordingly, no transfer error takes place even if the preparation for outputting the data is delayed.

In the present embodiment, a general purpose microprocessor is used as the device, although the device connected to the bus is not limited to the microprocessor. For example, an LSI such as a DSP may be connected.

In the present embodiment, the multi-master system is used. In a single master system, the transmission and the reception of the token are not required. In this case, the master transits the /BSY line 3 to the low level and transfers the data frame to the slave when the transfer request for the data frame is issued.

In the present embodiment, the master sends the data frame, and the slave receives it. Alternatively, the master may instruct the slave to output the data frame so that the slave outputs the data frame. In this case, the format number of the token is changed to change the format of the data frame.

In the present embodiment, all microprocessors connected to the bus receive the tokens. Where the microprocessors or LSI's which are exclusively used as the slaves are connected to the bus, it is not necessary to send the token to such devices.

In the present embodiment, the address data and the acknowledge data comprise eight bits, respectively, so that up to eight devices can be connected to the bus, although the number of devices to be connected may be changed by changing the number of bits of the address data and the acknowledge data. For example, when the address data and the acknowledge data comprise two bytes, respectively, up to 16 devices can be connected. In this case, the number of bits of the ADR of the token and the MA of the control data 61 must be 4 bits, respectively.

In the present embodiment, the controller outputs the token to itself, too, but the controller may not output the token to itself so long as the device connected to the bus can detect the transition status of the /BSY line by using the external interruption function. In this case, the controller has to transit the /BSY line to the low level more than the period Tb after it has output the token the last time, because the device which has received the token acquires the right to be the master for the period Tb after the reception of the token, and there is a possibility of collision in the transfer of the data frame if the master transits the /BSY line to the low level during this period.

In the present embodiment, when the microprocessor other than the controller outputs the data, the data line 1 is transited to the low level when the microprocessor which outputs the data is ready to output the data, and the controller outputs the byte clock after it has confirmed that the data line 1 is at the low level. If the period (Tb) of the byte clock is determined with a sufficient margin, such a procedure is not necessary.

In the present embodiment, the odd parity is used as the error detection code, although an other error detection code such as a cyclic redundancy check code may be used.

In the present embodiment, the controller evenly sends the tokens to all microprocessors connected to the bus, although the tokens may be distributed in other manners. For example, if the microprocessor 11 uses the bus more frequently than the microprocessor 12 does, the controller may send more tokens to the microprocessor 11 than to the microprocessor 12. Where the interval of the transfer requests for the data frame differs from microprocessor to microprocessor, the tokens may be sent in accordance with the interval of the transfer requests. For example, if the intervals of the transfer requests of the microprocessors 11 and 12 are 100 msec and 50 msec, respectively, the tokens may be sent to the microprocessors 11 and 12 at those intervals so that the sending of wasteful tokens is prevented and the bus can be effectively used. The distribution method of the tokens may be changed by the operation mode of the equipment. For example, where a microprocessor which assumes a rest mode is included, no token may be sent to the microprocessor in the rest mode. Specifically, when a camera build-in video tape recorder is in a playback mode, no token may be distributed to a microprocessor of a camera unit. Where the distribution method of the token is flexibly changed in accordance with the operation mode of the equipment, it is preferable that a microprocessor which manages the entire equipment have a controller function.

In the present embodiment, the address data 60 and the control data 61 are used as the header. However, the header is not limited thereto. For example, a one-byte data frame identifier may be used as the header. The data frame identifier is one-byte data which identifies the type of data frame, and it can specify master, slave and transfer bytes of the frame by the content of the data frame identifier. The microprocessor connected to the bus may prepare beforehand a list of data frame identifiers which it is to receive.

What is claimed is:

1. In a system comprising a plurality of devices including a controller, said plurality of devices being interconnected through a serial data bus comprising a data line, a clock line and a control line one, each of said devices being assigned a specific one of a plurality of device addresses, a data transfer method for effecting transfer of a data frame serially between a master designated from among said plurality of devices and at least one slave designated from among said plurality of devices, said data transfer method comprising:

(a) applying a high-level signal to said control line to cause a voltage of said control line to be at a high level;

(b) controlling said controller to output to said data line a sequence of tokens, each token of said sequence of tokens containing one of said plurality of device addresses, one token of said sequence of tokens being output at every predetermined time interval during a time period when said voltage of said control line is at said high level;

(c) causing said plurality of devices to receive said sequence of tokens and causing said master, when said master receives one token of said sequence of tokens containing one of said plurality of device addresses which is assigned to said master, to apply a low-level signal to said control line to change said voltage of said control line to a low level before said controller outputs a next token, whereby said low level of said voltage of said control line signifies that said master is presently operating as said master;

(d) controlling said master to output a signal identifying said at least one slave and to control said transfer of said data frame between said master and said at least one slave;

(e) when said transfer of said data frame is complete, controlling said master to stop applying said low-level signal to said control line so that said voltage of said control line returns to said high level; and (f) causing, during a time period when said voltage of said control line is at said low level, said controller to output to said clock line a clock signal required for said transfer of said data frame between said master and said at least one slave.

2. A data transfer method according to claim 1 wherein:

said signal identifying said at least one slave comprises multi-bit address data, each bit of said multi-bit address data specifying one of said plurality of device addresses, said multi-bit address data having at least one address bit set to a logical true value; and step (d) comprises controlling said master to output said multi-bit address data in synchronism with said clock signal, controlling said plurality of devices other than said master to determine whether said plurality of devices other than said master are included in said at least one slave in accordance with whether address bits of said plurality of devices other than said master are included in said at least one address bit set to a logical true value in said multi-bit address data and to effect said transfer of said data frame with said master after said master has output said multi-bit address data.

3. A data transfer method according to claim 1 wherein:

step (d) comprises controlling said master to send said data frame to said at least one slave and controlling each slave which is included in said at least one slave and which has received said data frame to send an acknowledge data block to said master;

each of said plurality of devices is assigned with a specific acknowledge code comprising at least one bit;

said acknowledge data block output by said each slave which has received said data frame comprises said specific acknowledge code assigned to said each slave at a low level, a remaining portion of said acknowledge data block being at a high level said acknowledge data block being output by said each slave to said data line in synchronism with a clock signal output by said controller; and said acknowledge data blocks output by said each slave are wired-ORed on said data line and received by said master.

4. A data transfer method according to claim 3 wherein:

said data frame comprises an error detection code for permitting, when said data frame contains a data error, detection of said data error; and said each slave detects said data error by using said error detection code and sends said acknowledge data block only when said data error is not detected.

5. A data transfer method according to claim 1 wherein:

said controller sends more of said tokens to one of said plurality of devices which more frequently uses said serial data bus than to one of said plurality of devices which less frequently uses said serial data bus.

6. A data transfer method according to claim 1 wherein:

said data frame comprises one or more transfer units each requiring an equal time for transmission;

said clock signal out said controller is a transfer clock signal required to transfer the data frame between said master and said at least one slave, one of said one or more transfer units at a time;

said master causes a voltage on said data line to be at said low level when said master is ready to output one of said one or more transfer units;

said controller outputs said transfer clock signal to said clock line after said master has caused said voltage on said data line to be at said low level; and said master causes said voltage on said data line to be at said high level when said master has finished outputting said data frame.

* * * * *